S. B. LYON.
CULTIVATOR.
APPLICATION FILED APR. 18, 1913.

1,109,438.

Patented Sept. 1, 1914.

2 SHEETS—SHEET 1.

Witnesses

Inventor
Sherley B Lyon
By Victor J. Evans
Attorney

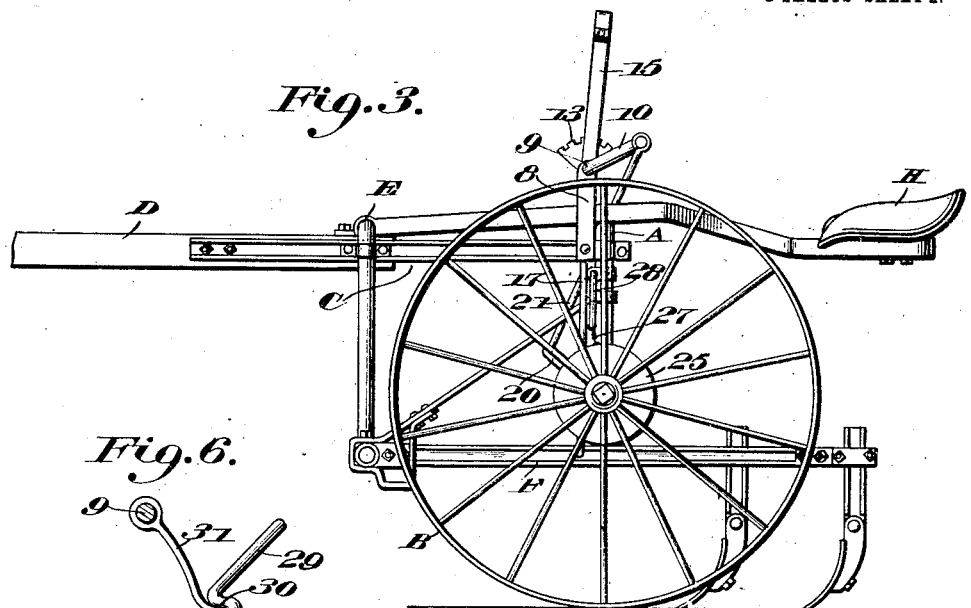
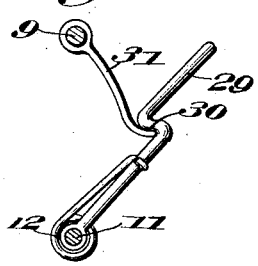
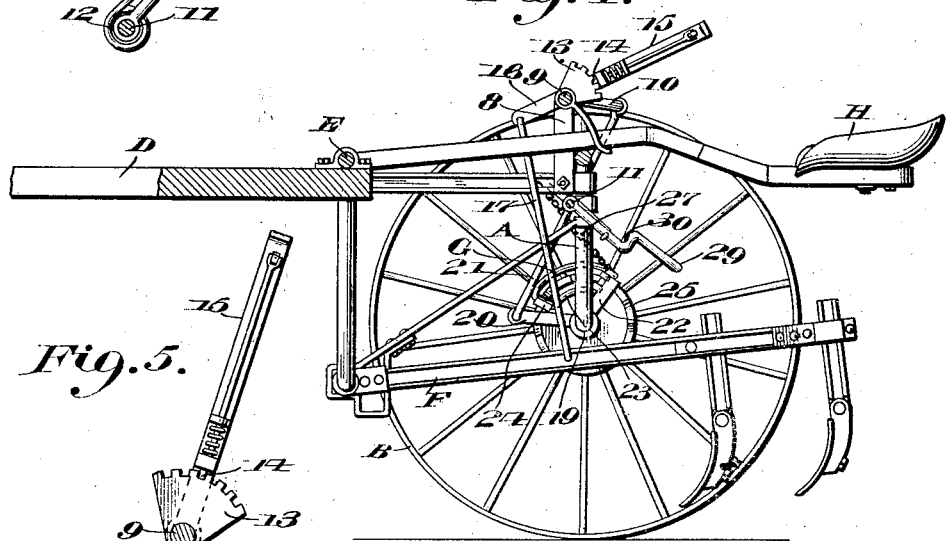

UNITED STATES PATENT OFFICE.

SHERLEY B. LYON, OF LEXINGTON, KENTUCKY.

CULTIVATOR.

1,109,438.
Specification of Letters Patent.
Patented Sept. 1, 1914.

Application filed April 18, 1913. Serial No. 761,998.

*To all whom it may concern:*

Be it known that I, SHERLEY B. LYON, a citizen of the United States, residing at Lexington, in the county of Fayette and State of Kentucky, have invented new and useful Improvements in Cultivators, of which the following is a specification.

This invention relates to cultivators, and the particular object of the invention is to provide simple and improved means whereby the cultivating members may be raised from and returned to the ground without manual effort on the part of the operator by power derived from the wheels of the cultivator.

A further object of the invention is to provide a simple and efficient attachment which may be readily applied to any ordinary type of riding cultivator and used in connection therewith for the purpose before mentioned of effecting adjustment of the cultivator members.

A further object of the invention is to provide simple and improved means whereby the depth to which the cultivating implements shall be permitted to enter into the ground may be gaged and regulated.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
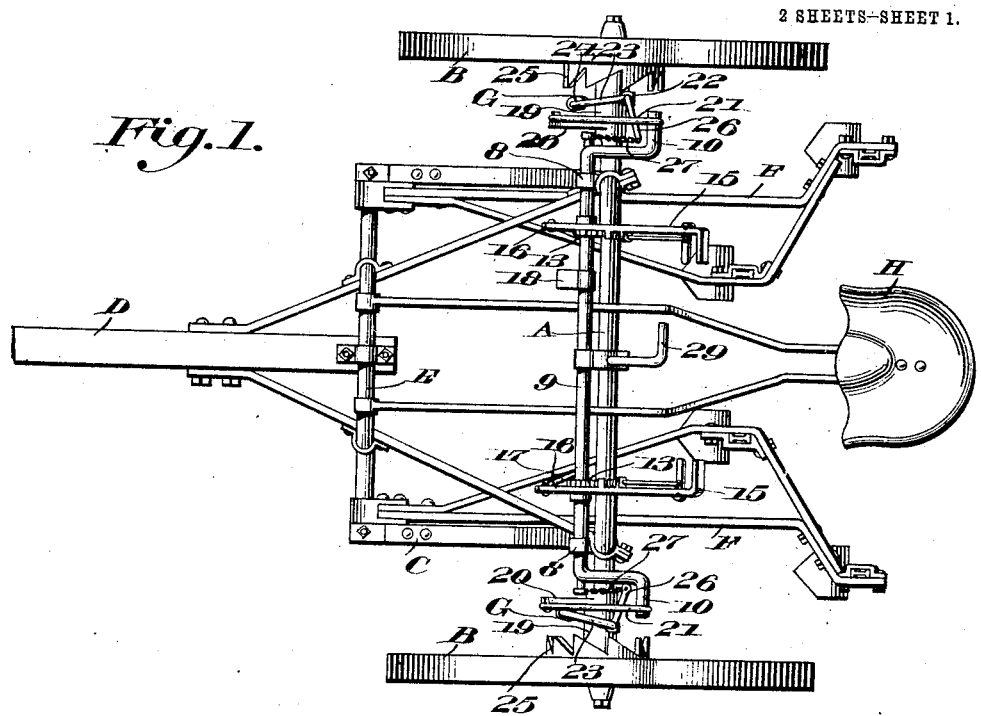
Figure 2:
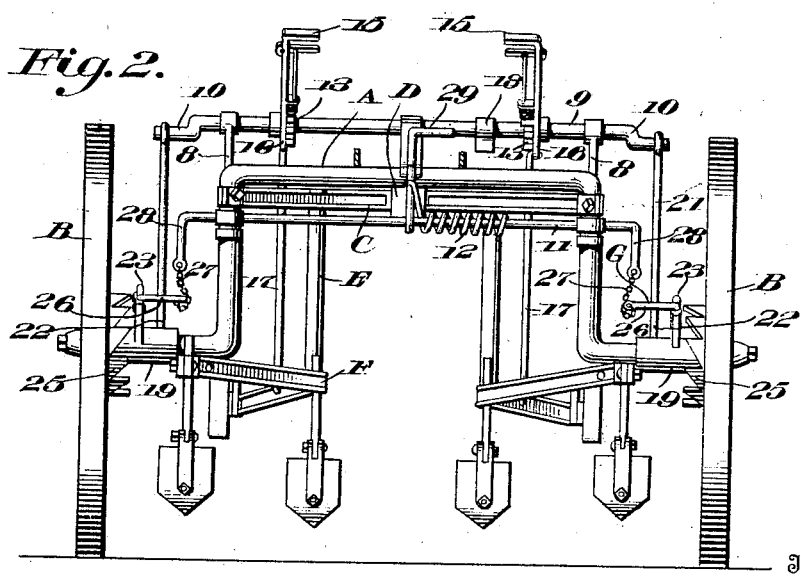

In the drawings, Figure 1 is a top plan view of a cultivator equipped with the improved attachment. Fig. 2 is a rear elevation of the same. Fig. 3 is a side elevation, showing the cultivating implements lowered. Fig. 4 is a longitudinal sectional view showing the cultivating implements raised from the ground. Fig. 5 is a sectional detail view showing particularly one of the adjusting levers for regulating the depth of the cultivating implements. Fig. 6 is a sectional detail view, enlarged, showing particularly the actuating lever and the latch member engaging the same.

Corresponding parts in the several figures are denoted by like characters of reference.

Referring to the drawing, A represents the arched axle, B, B, the wheels, C, the frame and D, the tongue of a conventional cultivator.

E is the front arch with the limbs of which the cultivator beams F are connected in the customary or in any suitable and convenient manner.

The improved attachment comprises brackets or supporting members 8 rising from the cultivator frame at either side thereof and affording bearings for a rock shaft 9 provided with terminal cranks 10. The rock shaft 9 is supported above the axle A and in substantially parallel relation to said axle and also in parallel relation to another rock shaft 11 which is supported below the first mentioned rock shaft 9 and which is actuated in one direction by means of a spring 12. Rack segments 13 which are secured on the rock shaft 9 are engaged by stop members 14 carried by hand levers 15, which latter are fulcrumed upon the rock shaft 9, and the downwardly extended arms 16 of which are connected with the cultivator beams F by means of links or rods 17. The oscillatory movement of the rock shaft 9 in one direction is limited by means of an arm 18 that extends radially from said rock shaft and is adapted to abut on the axle arch A of the cultivator. It will be seen that, the oscillatory movement of the rock shaft being thus limited, the extent of downward movement of the cultivator beams may be regulated and governed by proper adjustment of the hand levers 15.

Fitted loosely on the hub of each of the wheels B is a sleeve 19 having a radially extending arm 20 which is connected by a link or rod 21 with the crank 10 at the corresponding end of the rock shaft 9. Each sleeve 19 is provided with another arm 22 extending radially at an angle to the first mentioned arm 20 and carrying a bell crank G, one arm of which constitutes a frame 23 carrying a roller 24 adapted to engage the teeth of a ratchet wheel 25 secured on the proximate cultivator wheel B. The other arm 26 of the bell crank is connected by a cord or chain 27 with a crank 28 at either end of the spring actuated rock shaft 11. The latter is provided with a radially extending arm constituting a hand lever 29, whereby it may be rocked against the tension of its actuating spring, thereby actuating the bell cranks G to throw the rollers 24 carried by the frame-like arms of said bell cranks in engagement with the teeth of the ratchets 25. The arm or lever 29 is formed with a catch 30 adapted to engage a stop arm 31 that extends radially from the rock shaft 9.

When the arm or lever 29 is pressed by the operator whose seat H is located in rear of the axle arch, the bell cranks G will be actuated to place the rollers 24 carried thereby in engagement with the ratchets 25 on the cultivator wheels, by the rotation of which the sleeves 19 will be partly rotated with the hubs of the wheels, thus causing the rock shaft 9 to be oscillated by the connection between the arms 20 of the sleeves 19 and the terminal cranks 10 of the rock shaft. The cultivator beams will thus be raised from the ground by the rods or links 17 which connect said beams with the downwardly extending arms 16 of the hand levers 15. At the proper time the arm or lever 29 is released by the operator, and it will now be thrown in a forward direction by the tension of the actuating spring 12, placing the catch 30 in the path of the stop arm 31 and thus retaining the rock shaft 9 in its adjusted position, while at the same time the rollers 24 carried by the bell cranks G are released from the ratchets 25. The cultivator beams are thus supported in a raised position for traveling or for turning the machine at the end of the row. In order to lower the cultivator beams, it is only necessary to press the arm or lever 29 to disengage the catch 30 from the stop arm 31, when the cultivator beams will descend by gravity, until the further rotation of the rock shaft 9 is obstructed by contact of the stop arm 18 with the axle arch; the extent of the descent being governed by previous adjustment of the hand levers 15, as hereinbefore described.

Having thus described the invention, what is claimed as new, is:—

1. A riding cultivator having supporting wheels and implement carrying beams, a rock shaft supported on the cultivator frame, stop means for limiting the oscillation of the rock shaft in one direction, means connecting the rock shaft with the beams to elevate the latter by the oscillation of the rock shaft, means for transmitting motion from a supporting wheel to the rock shaft including a crank on the latter, a member supported for oscillation about the axis of the supporting wheel and having a radial arm, means connecting said arm with the crank of the rock shaft, a bell crank fulcrumed on the oscillatory member, a ratchet wheel secured on the supporting wheel and concentric therewith, and ratchet engaging means carried by one arm of the bell crank; a spring actuated rock shaft supported in substantially parallel relation to the first mentioned rock shaft and having a crank, means connecting said crank with the second arm of the bell crank, a lever extending radially from the spring actuated rock shaft and having a catch, and a stop member extending from the first mentioned rock shaft and adapted to engage said catch.

2. A riding cultivator having supporting wheels and implement carrying beams, a rock shaft supported on the cultivator frame and having segment racks, levers fulcrumed upon the rock shaft and having stop members adjustably engaging the segment racks, links connecting the levers with the beams, means for transmitting motion from a supporting wheel to the rock shaft including an oscillatory member and a bell crank fulcrumed thereon for throwing the transmission means into and out of gear, a spring actuated rock shaft supported in substantially parallel relation to the first mentioned rock shaft and having a terminal crank, means connecting said crank with the bell crank governing the transmission means, means for limiting the oscillation of the first mentioned rock shaft in one direction, a stop member extending from said rock shaft, and a lever extending from the spring actuated rock shaft and having a catch adapted to engage the stop member.

In testimony whereof I affix my signature in presence of two witnesses.

SHERLEY B. LYON.

Witnesses:
C. E. NORMAN,
HALLIE PERKINS.